3,264,688
FEEDING AND CUTTING MEANS FOR SUPPLYING
SOLID PLASTIC IN FRAGMENTED CONDITION
Donald B. McIlvin, Danvers, Mass., assignor to United
Shoe Machinery Corporation, Boston, Mass., a corporation of New Jersey
Original application Oct. 17, 1962, Ser. No. 231,222, now Patent No. 3,200,438, dated Aug. 17, 1965. Divided and this application Feb. 5, 1965, Ser. No. 430,632
3 Claims. (Cl. 18—30)

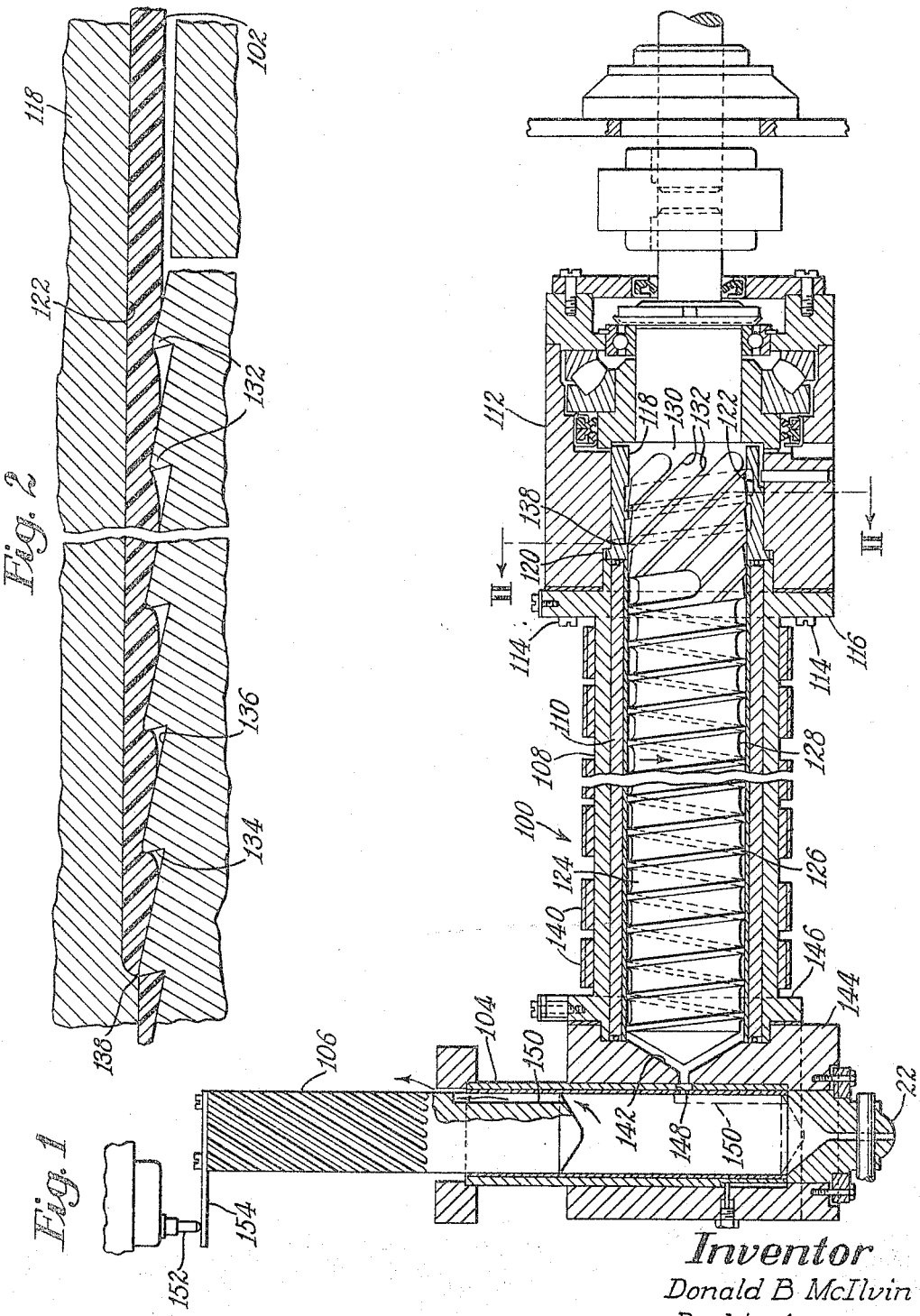

This is a division of application Serial No. 231,222, filed October 17, 1962 and now Patent No. 3,200,438, in the name of Donald B. McIlvin.

This invention relates to injection molding machines and is herein illustrated in its application to machines of the type disclosed in United States Letters Patent No. 3,006,032, granted October 31, 1961 on an application filed in the names of Baker, Berggren, McIlvin and Spencer. It is to be understood, however, that the invention is not limited in scope to machines of this type, but in certain respects is applicable generally to injection molding machines.

It is an object of the present invention to provide more effective and reliable means for supplying fluid plastic to the mold charging means of injection molding machines. A further object of the invention is to provide a constant and reliable flow of plastic to a mold charging means. It is still another object of the present invention to provide a feeding and cutting means for supplying solid plastic in fragmented form to the auger of an extruder.

With the above and other objects in view, as will hereinafter appear, the present invention contemplates the provision in an injection molding machine of an organization for supplying fluid plastic to the mold charging means. More particularly, to provide for a constant and reliable flow of plastic to the mold charging cylinder, the illustrated machine is provided with an improved feeding and cutting means for supplying solid plastic in fragmented condition to the auger of an extruder. Plastic is fed to the feeding and cutting means in the form of a continuous length of tape. The tape is fed through a suitable opening in an extruder cylinder to a head mounted to rotate in the cylinder, the head having a cutter which feeds the tape along a predetermined path within the cylinder to a shearing point where an end portion of the tape is sheared off against a stationary cutter mounted in the cylinder. In the illustrated organization, the inner wall of the cylinder is provided with a helical groove for guiding the tape. The stationary cutter is located at the terminus of the helical groove. Preferably, the cutter carried by the head extends helically about the head at an angle such that fragmented plastic is fed by the cutter from the head to the auger. The illustrated head has a plurality of such cutters uniformly spaced from each other about the head to cut the tape into fragments of desired length. The cutters feed the tape through the helical groove in the inner wall of the cylinder to the shearing point and after the shearing operation the cutters continue feeding the then fragmented plastic downstream to the auger. The constant feed of plastic from the head to the auger keeps the auger fully loaded and enables it to maintain a constant and uniform flow of fluid plastic into the mold charging cylinder.

These, and other features of the invention, will now be described with reference to the accompanying drawings and pointed out in the appended claims.

In the drawings,

FIG. 1 is a plan view of the mold charging organization, mainly in section on a plane common to the axis of the extruder; and FIG. 2 is a broken developmental view taken on the helical line II—II of FIG. 1.

Referring to FIG. 1, the illustrated machine includes an extruder 100 of the auger type which receives plastic in the form of a continuous tape 102 (FIG. 2) from a reel (not shown) and after a milling application thereon by the extruder, transmits the plastic in fluid condition to a cylinder 104 in which operates a piston 106 whereby fluid plastic in the cylinder 104 is expelled through the injection nozzle 22 into the mold cavity.

The illustrated extruding assembly comprises a casing 108 in which is mounted a sleeve 110 of wear resisting material. At its right end portion, as viewed in FIG. 1, the casing is secured to a block 112 by screws 114 extending through a flange 116 formed in the casing. The block 112 is bored to receive a short sleeve 118 and counterbored to receive an outwardly extending flange 120 of the sleeve 118 and the end portions of the casing 108 and the sleeve 110. The short sleeve 118 has formed in its inner surface a helical groove 122 of decreasing depth into which a length of tape is fed from a supply through a port formed in the block 112 and the sleeve 118. The extruder is provided with a rotary screw 124 having a single thread 126, the flights of which are spaced apart from each other to an extent slightly greater than the width of the tape 102. A helical groove 128 between the flights of the thread decreases in depth from the receiving end of the screw to a point near the center of the groove lengthwise thereto and proceeds from that point downstream to the delivery end of the screw at approximately a uniform depth.

At its receiving end the screw 124 has a cylindrical head 130 which is provided with a plurality of spaced teeth 132 helically arranged about the head 130. The teeth 132 are constructed and arranged as shown in FIG. 2 with a leading undercut edge face 134 and an inclined upper surface 136 extending from the base of one tooth to a narrow rand forming an acute angle with the edge face 134, the angle between the edge face and the rand providing a cutting edge whereby the teeth feed the tape 102 through the groove 122 and to a cutting edge 138 formed at the terminus of the groove 122 where the tape is cut into short lengths by the shearing action of the teeth 132 against the stationary cutter 138. After cutting the tape into short lengths the teeth 132 operate to feed the short lengths downstream to the screw 124. The screw continues the feeding of the short lengths of tape and applies to the tape a vigorous milling or plasticating action which causes an increase in its temperature sufficient to reduce the plastic from a solid to a fluid state. In order to counteract any loss of heat from the plastic by radiation through the cylinder 104, suitable heating bands 140 are arranged about the outer surface of the casing 108. At the discharging end of the auger the fluid plastic flows into a shallow conical recess 142 formed in a block 144 which provides a union between the extrusion assembly and the injection assembly. The block 144 is counterbored to receive the extremity of the casing 108 which has an outwardly extending flange 146. The recess 142 communicates with a port 148 formed in the cylinder 104. When the piston 106 is in its advanced position, indicated by broken lines in FIG. 1, fluid plastic flows into the downstream end portion of the cylinder 104 and into the nozzle 22 through a longitudinal groove 150 formed in the piston 106 and communicating with the port 148.

In the operation of the extruding and ejecting assembly the piston 106 is retracted into its position illustrated by full lines in FIG. 1 by the pressure of the fluid plastic extruded into the cylinder 104. The retracting movement of the piston 106 is arrested upon the termination of the rotation of the screw 124. In the normal operation of the machine rotation of the screw is caused to terminate by the operation of a microswitch 152 by a plate 154 secured to the rear end portion of the piston 106. In the event of a failure of the microswitch 152 to operate, or a failure of the extruded clutch (not shown) to open, rearward movement of the piston 106 continues briefly until the rear end portion of the groove 150 passes beyond the end wall of the cylinder 104, thus permitting the escape of fluid plastic from the rear end portion of the groove 150 and obviating possible damage to the machine by an increase in pressure of fluid plastic in the cylinder 104.

Having thus described my invention, what I claim as new and desire to secure by Letters Patent of the United States is:

1. Feeding and cutting means for supplying solid plastic in fragmented condition comprising a sleeve having a helical groove along its inner wall, a screw having a head mounted to rotate in said sleeve, a stationary cutter disposed in the sleeve and adjacent said head, and means for feeding a length of plastic tape through said helical groove, said feeding means comprising a plurality of cutters carried by said head and engageable with said tape, said cutters carried by said head being further engageable with said stationary cutter to shear off fragments from said length of plastic tape.

2. Feeding and cutting means for supplying solid plastic in fragments comprising a sleeve, a screw having a head mounted to rotate in said sleeve, said sleeve having a helical groove in its inner wall, said helical groove being adjacent throughout its length to said head, means for feeding a length of plastic through said helical groove, said feeding means comprising cutter means carried by said head, and a stationary cutter disposed in said sleeve, and engageable with cutter means carried by said head, whereby to shear off an end portion of the length of plastic.

3. Feeding and cutting means for supplying solid plastic in fragmented condition to a rotary screw comprising a sleeve, a head portion of said screw mounted to rotate in said sleeve, said sleeve having a helical groove in its inner wall, said helical groove being adjacent throughout its length to said head, said sleeve having an inlet adjacent said head for the admittance of solid plastic tape, helical cutters mounted on said head, a stationary cutter disposed in said sleeve and engageable with said helical cutters, said helical cutters being adapted to advance said tape along said groove from said inlet to said stationary cutter whereby to shear off an end portion of the length of tape.

References Cited by the Examiner

UNITED STATES PATENTS

| | | | |
|---|---|---|---|
| 1,810,023 | 6/1931 | Lodge | 18—12 |
| 2,319,859 | 5/1943 | Hale | 18—12 |
| 2,579,747 | 12/1951 | Martin | 18—12 |
| 2,705,343 | 4/1955 | Hendry | 18—30 |
| 2,754,545 | 7/1956 | Hendry | 18—30 |
| 2,807,832 | 10/1957 | Davis | 18—12 |
| 2,991,503 | 7/1961 | Rietz | 18—12 |
| 3,101,511 | 8/1963 | Heston | 18—12 |
| 3,145,420 | 8/1964 | Joukainen et al. | 18—12 |

FOREIGN PATENTS 840,596    7/1949    Germany.

J. SPENCER OVERHOLSER, *Primary Examiner.*

W. L. McBAY, *Assistant Examiner.*